(No Model.) 2 Sheets—Sheet 1.

W. H. RODGERS.
AUTOMATIC EXHIBITOR.

No. 445,456. Patented Jan. 27, 1891.

WITNESSES:
Gustave Dieterich
William Goebel.

INVENTOR
William H. Rodgers
BY
Chas. S. Williams,
ATTORNEY.

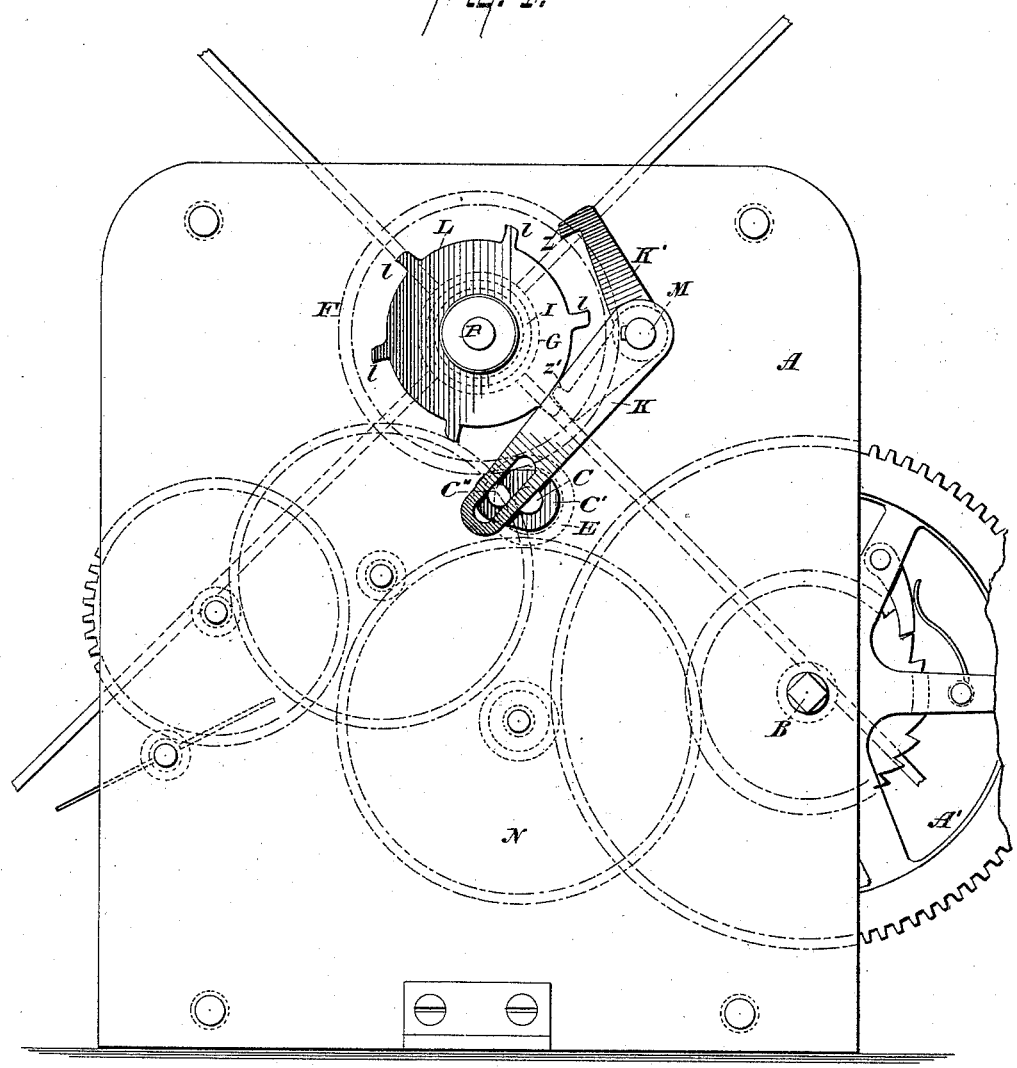

UNITED STATES PATENT OFFICE.

WILLIAM H. RODGERS, OF BROOKLYN, NEW YORK.

AUTOMATIC EXHIBITOR.

SPECIFICATION forming part of Letters Patent No. 445,456, dated January 27, 1891.

Application filed September 12, 1890. Serial No. 364,789. (No model.)

*To all whom it may concern:*

Be it known that I, WILLIAM H. RODGERS, a citizen of the United States, residing at Brooklyn, in the county of Kings and State of New York, have invented a new and useful Improvement in Automatic Exhibitors, of which the following is a specification.

My invention relates to an improvement in an automatic exhibitor, for which exhibitor I have obtained Letters Patent of the United States No. 412,203, dated October 1, 1889. In the said automatic exhibitor two motors or trains of wheels are used, one motor for driving the revolving picture-carrying disk and catch-wheel and the other motor for driving the arresting-catch.

The object of my improvement is to have the revolving picture-carrying disk, the catch-wheel, and the arresting-catch all driven by the same motor, thus doing away with the second motor. This I accomplish by means of a gear-wheel driven by the same motor that drives the arresting-catch, loosely set upon the same shaft as the picture-carrying disk and catch-wheel, and having attached to it a spring adapted by the revolution of the gear-wheel to impart a rotary motion to the picture-carrying disk and the catch-wheel.

I refer to the accompanying drawings, like letters showing like parts throughout, and in which—

Figure 1:
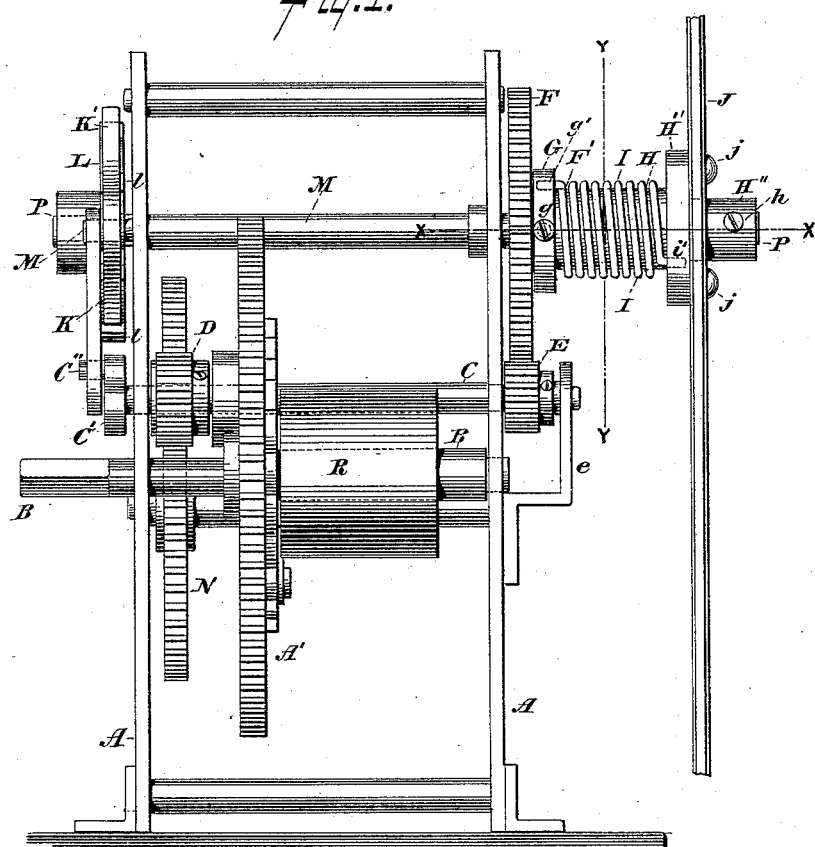
Figure 3:
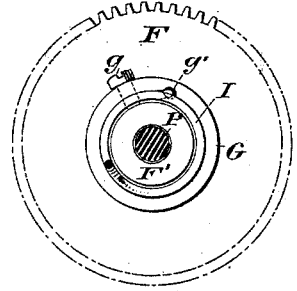
Figure 2:
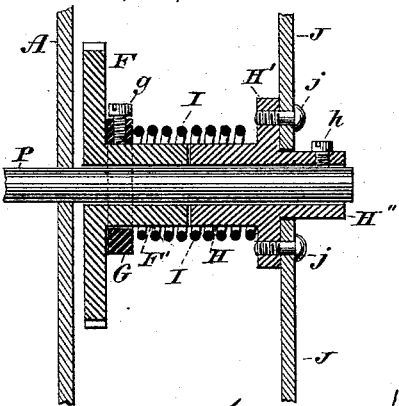

Figure 1, Sheet 1, is a side view of my improvement. Fig. 2, Sheet 1, is a sectional view on the line *x x* of Fig. 1. Fig 3, Sheet 1, is a sectional view on the line *y y* of Fig. 1. Fig. 4, Sheet 2, is a front view.

Attached to suitable metal plates A A is a motor or train of wheels A' N, driven by a spring R. The wheel N engages with a pinion D upon the shaft C. Upon the outer or front plate A, revolving with and fixed upon the same shaft as the pinion D, is a cam or crank C', having a pin C'', working in a slot of an arm K, also on the outer or front plate A. Fixed upon and having an oscillating motion with the shaft M is a catch or pallet K', also on the outer side of the plate A, which engages with the teeth *l l* of a catch-wheel or escapement-wheel L. The catch or pallet K' and the arm K are rigidly connected at the shaft M. The catch or pallet K' is so formed that the inside of the projecting point Z, which engages with the teeth *l l*, and the outside of the point Z', which also engages with the teeth *l l*, form portions of an arc having a radius from the inside of Z to the center of the shaft M or from the outside of the point Z' to the center of the shaft M. The teeth *l l* are caught inside of the projecting point of K' at Z and outside of it at Z'.

Rigidly fixed upon the shaft P on the outer or front side of the plate A is a catch-wheel or escapement-wheel L, having teeth *l l*. The working-edges of these teeth where they come in contact with the point Z' of the catch K' are always perpendicular to the tangent to the circle of which the portions Z and Z' of the catch K' form an arc, as above stated, and where they come in contact at the point Z they are always in the line of the diameter of the same arc, the object being to prevent any jar or vibration of the catch or escapement wheel L when one tooth is disengaged and another is caught. In number the teeth *l l* are always one-half the number of slides or objects shown upon the picture-carrying disk.

Upon the shaft P, on the inner or rear side of the plate A, is a gear-wheel F, having a projecting hub F'. The gear-wheel F, with its hub F', is loosely placed on the shaft P, and has fitting over the hub F' a ring or collar G, capable of being adjusted upon the hub F' by a set-screw *g*. Rigidly fixed upon the shaft P and in contact with the hub F' is a second hub H, with flange H', to which flange the picture-carrying disk J is rigidly fixed. Around the hubs F' H is placed a spiral spring I, one end of which is attached to the ring or collar G at the point *g'* and the other end attached to the flange H' at the point *i'*. In construction the flange H' is not essential, it only being necessary that the spiral spring I and rotating disk J should be rigidly attached to the hub H.

The shaft C projects beyond the plate A on the inner or rear side, and at this point is rigidly fixed, so as to revolve with the shaft C, a pinion E, which engages with the gear-wheel F. The number of teeth in the pinion E is always twice the number of teeth in the catch-wheel L, and the proportion of teeth in the pinion E and gear-wheel F is in the mechanism illustrated as six to one and proportionately where more slides or pictures are used in the exhibiting-disk.

Instead of a spring R the motor may be driven by weight or any power that will give a regular motion.

The unlettered wheels and fly-fan shown in in outline in Fig. 4, Sheet 2, are merely to regulate the motor.

The picture-carrying disk J is similar to that set forth in Letters Patent No. 412,203, dated October 1, 1889, and its use with lens and magic lantern is the same.

The operation of my improvement is as follows: The cam or crank C' is set in motion by the motor. The pin C'', revolving with the cam C' and working in the slot of the arm K, causes the arm K to vibrate right and left, and with it the catch or pallet K', thus lifting the point Z or Z', as the case may be. The motor, through the pinion E, drives the gear-wheel F, which, turning loosely on the shaft P, twists or winds up the spiral spring I, one end of which is fixed in the ring or collar G and the other end in the flange H' of the hub H. This twisting or winding up of the spiral spring I gives a rotary motion to the picture-carrying disk J and the catch-wheel L, which is controlled in its action by the contact of the point Z or Z' of the pallet or catch K' with the teeth l l of the catch-wheel, and as soon as a tooth l l is released by the pallet or catch K' the spring I throws the catch-wheel L over the distance between the teeth l l and at the same time throws over the picture-carrying disk a distance necessary to change the display of one object for another. The spiral spring I is also relaxed and returns to a position to be rewound or twisted up again by the continued action of the gear-wheel F. The rotary pressure to be exerted by the twisting or winding up of the spiral spring I is regulated by the position of the ring or collar G upon the hub F' by means of the set-screw g. The hub F' projects sufficiently to come into contact with the hub H to prevent any lateral play of the gear-wheel F upon the shaft P.

Having fully described my invention, what I claim, and desire to protect by Letters Patent, is—

1. The combination of a rotary picture-carrying disk rigidly attached to a shaft, a catch-wheel rigidly attached to and revolving with the same shaft, a gear-wheel revolving loosely upon the same shaft as the picture-carrying disk and catch-wheel, a pallet or catch to catch or release the catch-wheel, and a motor for operating said gear-wheel and said pallet or catch, the gear-wheel having attached to it a spring adapted by the revolution of the gear-wheel to give a rotary motion to the picture-carrying disk and the catch-wheel at the time the catch-wheel is released by the pallet or catch, substantially as described.

2. The combination of a rotary picture-carrying disk rigidly attached by a hub to a shaft, a catch-wheel rigidly attached to and revolving with the same shaft, a gear-wheel revolving loosely upon the same shaft as the picture-carrying disk and catch-wheel and having a projecting hub in contact or substantially in contact with the hub of the picture-carrying disk, a pallet or catch to catch or release the catch-wheel, and a motor to operate the gear-wheel and the pallet or catch, said gear-wheel having adjustably attached to the projecting hub a ring or collar to which is fixed one end of a spiral spring, the other end of said spring being attached to the hub of the picture-carrying disk, so that a rotary motion is thereby given by the revolution of the gear-wheel to the picture-carrying disk and catch-wheel at the time the catch-wheel is released by the pallet or catch, substantially as described.

WILLIAM H. RODGERS.

Witnesses:
FRANK J. GARDNER,
ROBT. DUNSMORE.